United States Patent
Ryu et al.

(10) Patent No.: US 8,758,944 B2
(45) Date of Patent: Jun. 24, 2014

(54) LITHIUM SECONDARY BATTERY CONTAINING ADDITIVE FOR IMPROVED HIGH-TEMPERATURE CHARACTERISTICS

(75) Inventors: Suyoung Ryu, Daejeon (KR); Dongmyung Kim, Daejeon (KR); Eun young Kim, Seoul (KR)

(73) Assignee: LG Chem, Ltd., Seoul (KR)

( * ) Notice: Subject to any disclaimer, the term of this patent is extended or adjusted under 35 U.S.C. 154(b) by 537 days.

(21) Appl. No.: 12/741,947

(22) PCT Filed: Nov. 7, 2008

(86) PCT No.: PCT/KR2008/006562
§ 371 (c)(1),
(2), (4) Date: Sep. 13, 2010

(87) PCT Pub. No.: WO2009/061143
PCT Pub. Date: May 14, 2009

(65) Prior Publication Data
US 2011/0014517 A1    Jan. 20, 2011

(30) Foreign Application Priority Data
Nov. 9, 2007 (KR) ......................... 10-2007-0114048

(51) Int. Cl.
*H01M 6/14* (2006.01)
*H01M 10/0566* (2010.01)
*H01M 10/0564* (2010.01)

(52) U.S. Cl.
CPC ...... *H01M 10/0566* (2013.01); *H01M 10/0564* (2013.01); *H01M 2300/0017* (2013.01)
USPC .......................................... 429/303; 429/329

(58) Field of Classification Search
CPC ............... H01M 10/0564; H01M 10/0566; H01M 10/0025; H01M 2300/0017
USPC .................................................. 429/303, 329
See application file for complete search history.

(56) References Cited

U.S. PATENT DOCUMENTS

| 5,521,027 | A | 5/1996 | Okuno et al. |
| 5,525,443 | A | 6/1996 | Okuno et al. |
| 6,395,429 | B1 * | 5/2002 | Kang et al. .................. 429/306 |
| 6,727,024 | B2 | 4/2004 | Kang et al. |
| 6,841,303 | B2 * | 1/2005 | Park et al. .................. 429/303 |
| 2004/0048163 | A1 * | 3/2004 | Park et al. ................ 429/329 X |
| 2005/0042520 | A1 | 2/2005 | Roh et al. |
| 2007/0048616 | A1 | 3/2007 | Okumura et al. |

FOREIGN PATENT DOCUMENTS

| JP | 5-121101 A | 5/1993 |
| JP | 11-040194 | 2/1999 |
| JP | 11-111334 A | 4/1999 |
| JP | 2000-123867 A | 4/2000 |
| JP | 2002-25611 A | 1/2002 |
| JP | 2002-198095 | 7/2002 |
| JP | 2002-270230 A | 9/2002 |
| JP | 2007-142062 | 6/2007 |
| KR | 2001-0037163 A | 5/2001 |

* cited by examiner

Primary Examiner — Zachary Best
(74) Attorney, Agent, or Firm — Birch, Stewart, Kolasch & Birch, LLP

(57) ABSTRACT

Provided is a secondary battery containing polyalkyleneglycol diglycidylether represented by formula I added in a predetermined amount to an electrolyte for the battery. The secondary battery containing the above additive exhibits remarkably improved high-temperature characteristics, prevents deterioration in rate characteristics and cycle characteristics, and considerably reduces thickness swelling of the battery so as to prevent battery leakage, ultimately enhancing safety of the battery.

6 Claims, 2 Drawing Sheets

LITHIUM SECONDARY BATTERY CONTAINING ADDITIVE FOR IMPROVED HIGH-TEMPERATURE CHARACTERISTICS

FIELD OF THE INVENTION

The present invention relates to a secondary battery containing an additive for improving high-temperature characteristics and, more particularly, to a lithium secondary battery with excellent high-temperature performance and lifespan, including an ionic salt based electrolyte as well as a particular additive.

BACKGROUND OF THE INVENTION

With increased development of technologies for mobile devices and requirements for the same, demand for a battery as an energy source of the mobile device has rapidly increased. Under such circumstances, a great deal of study and investigation into novel batteries satisfying various consumer needs has been conducted. Especially, a lithium secondary battery such as a lithium ion battery, a lithium ion polymer battery, etc. having excellent energy density, discharge voltage, output stability and the like are in great demand.

In general, a lithium secondary battery includes a cathode active material based on a metal oxide such as $LiCoO_2$, an anode active material based on a carbon material, a porous polymer membrane interposed between a cathode and an anode, and a non-aqueous electrolyte containing a lithium salt such as $LiPF_6$ provided therein. During charge, lithium ions contained in the cathode active material are released and enter into a carbon layer in the anode, while lithium ions are released from the carbon layer and enter into the cathode active material during discharge. The non-aqueous electrolyte is a medium through which the lithium ions move between the anode and the cathode. Such a lithium secondary battery must be stable in operating voltage ranges of the battery and have a high rate of ion delivery.

If the non-aqueous electrolyte includes only cyclic carbonates with high polarity sufficient to dissociate lithium ions, a viscosity of the electrolyte may be increased, leading to a decrease in ion conductivity thereof.

U.S. Pat. Nos. 5,521,027 and 5,525,443 describe an electrolyte mixture including a linear carbonate having reduced viscosity and polarity as well as a cyclic carbonate in order to decrease a viscosity of the electrolyte. Representative examples of such a linear carbonate include dimethyl carbonate (DMC), diethyl carbonate (DEC), ethylmethyl carbonate (EMC), etc. and, among these compounds, EMC having the lowest freezing point of −55° C. is preferably used to exhibit superior low-temperature performance and lifespan. Representative examples of the cyclic carbonate include ethylene carbonate (EC), propylene carbonate (PC), butylene carbonate (BC), etc. Among these compounds, although PC having a relatively low freezing point of −49° C. is preferably used to exhibit favorable low-temperature performance, this compound may vigorously react with an anode of a battery during charge when a graphitized carbon with a high capacity is used as the anode. Therefore, instead of PC, which is difficult to use in large amounts, EC capable of forming a stable protection film at the anode is generally used. However, since EC is not entirely non-active with the cathode (or may also be slightly active with the cathode), decomposition of the electrolyte occurring at the anode and the cathode during charge/discharge of a battery may be a cause for deterioration in lifespan of the battery and EC has increased activity at a high temperature, thus being undesirable.

Accordingly, in order to solve the above problems and enhance lifespan of a battery at room temperature and high temperatures, Japanese Laid-Open Application No. 2000-123867 discloses a battery fabricated by adding a small amount of an ester compound, which has a cyclic molecular structure and C=C unsaturated bonds in a ring (such as vinylene carbonate), to an electrolyte. It is considered that such ester compound as an additive is decomposed at either an anode or a cathode and forms a film on a surface of the electrode so as to inhibit decomposition of the electrolyte. However, the above additive cannot completely prevent decomposition of the electrolyte.

Further, Japanese Laid-Open Application No. 2002-25611 discloses a battery fabricated by adding ethylene sulfite and vinylene carbonate to an electrolyte, while Japanese Laid-Open Application No. 2002-270230 proposes another battery fabricated by adding at least one of various ethylene sulfite compounds to an electrolyte. However, it was found that no additive described in these prior arts can exhibit desirable effects.

Accordingly, in consideration of performance at high temperatures, there is still a strong need for development of effective additives in secondary battery applications.

SUMMARY OF THE INVENTION

Therefore, the present invention has been made to solve the above problems and other technical problems that have yet to be resolved.

The present inventors have undertaken extensive research and studies and found that a novel lithium secondary battery with noticeably improved high-temperature performance and lifespan characteristics can be fabricated by adding polyalkyleneglycol diglycidylether to an electrolyte of the battery. As a result, the present invention has been accomplished.

On the basis of this finding, it is an object of the present invention to provide a secondary battery including an ionic salt based electrolyte, wherein a substance represented by the following formula (I) is added in an amount of 0.1 to 10% by weight ("wt. %") to the total weight of the electrolyte so as to enhance high-temperature characteristics of the battery:

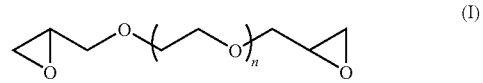

(I)

wherein n is an integer ranging from 0 to 10.

According to the present invention, when a battery is stored or used at a high temperature, a decomposition reaction between an electrode and an electrolyte of the battery may be decreased which in turn considerably reduces gas generated thereby, so that deterioration of a cycle at elevated temperature and/or capacity reduction caused by high temperature storage of the battery may be significantly decreased and, in addition, thickness swelling of the battery may be inhibited. Moreover, the battery containing the electrolyte prepared as described above does not suffer from performance deterioration, thus exhibiting enhanced safety.

The substance of formula I according to the present invention is contained in the electrolyte as an additive and, as defined above, a content of the substance may range from 0.1 to 10 wt. % and, preferably, 1 to 7 wt. % to the total weight of the electrolyte. This substance is duly distinguished from other substances as a cross-linking agent added to a gel polymer electrolyte.

If the amount of the additive is too small, the additive may be little effective. Conversely, when the amount is too large, a viscosity of the electrolyte may be increased while a battery manufactured using the electrolyte may exhibit high resistance, causing undesirable deterioration in performance of the battery.

In formula I, n may be an integer ranging from 0 to 10 as defined above and, preferably, 1 to 6.

The compound of formula I according to the present invention may be easily prepared by those skilled in the art based on a chemical formula thereof or may be commercially available and, therefore, further detailed description thereof will be omitted hereinafter for brevity and to prevent the present invention from being unclear.

The ionic salt used herein may include a lithium salt and the lithium salt is a material readily soluble in the electrolyte of the present invention and may include, for example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium 4-phenyl borate, imides, etc. Among these, $LiClO_4$, $LiCF_3SO_3$, $LiC_4F_9SO_3$, $LiBF_4$, $LiAsF_6$, $LiN(C_2F_5SO_2)_2$ and $LiN(CF_3SO_2)_2$ are especially preferred.

The electrolyte may include a non-aqueous electrolyte and such non-aqueous electrolyte may include an aprotic organic solvent such as N-methyl-2-pyrrolidinone, propylene carbonate (PC), ethylene carbonate (EC), butylene carbonate (BC), dimethyl carbonate (DMC), diethyl carbonate (DEC), ethylmethyl carbonate (EMC), γ-butyrolactone, 1,2-dimethoxyethane, tetrahydrofuran, 2-methyl tetrahydrofuran, dimethylsulfoxide, 1,3-dioxolan, formamide, dimethylformamide, dioxolan, acetonitrile, nitromethane, methyl formate, methyl acetate, phosphoric acid triester, trimethoxy methane, dioxolan derivatives, sulfolane, methyl sulfolane, 1,3-dimethyl-2-imidazolidinone, propylene carbonate derivatives, tetrahydrofuran derivatives, ether, methyl propionate, ethyl propionate, etc. These materials may be used alone or in combination with two or more thereof.

Among these materials, a mixture of at least one linear carbonate compound and at least one cyclic carbonate compound is more preferred.

Occasionally, the non-aqueous electrolyte of the present invention may include, for example, pyridine, triethylphosphite, triethanolamine, cyclic ether, ethylenediamine, n-glyme, hexaphosphoric acid triamide, nitrobenzene derivatives, sulfur, quinone imine dyes, N-substituted oxazolidinone, N,N-substituted imidazolidinine, ethyleneglycol dialkylether, ammonium salts, pyrrol, 2-methoxy ethanol, tri-chloro aluminum, vinylene carbonate, propylene sulfone, etc., which is added to the electrolyte to enhance charge/discharge characteristics and/or flame resistance. Moreover, in order to make the electrolyte flame retardant, a halogen based solvent such as carbon tetrachloride, ethylene trifluoride, etc. may further be added to the electrolyte.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Figure 1:
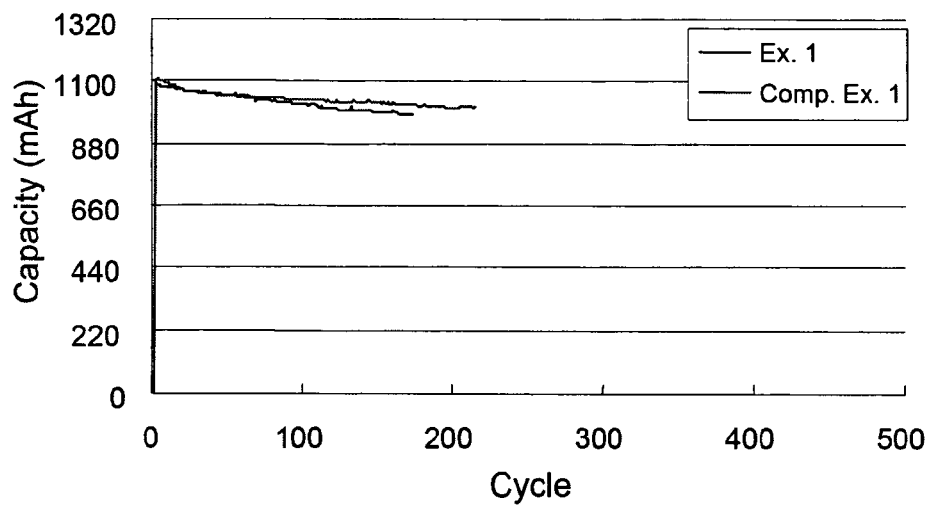
FIG. 1 contains graphs illustrating variation in capacity of a battery cell according to the present invention fabricated in Example 1, compared to a conventional battery cell fabricated in Comparative Example 1, according to Experimental Example 1 of the present invention.

The secondary battery of the present invention may be a lithium secondary battery and various components constituting the lithium secondary battery will be described in detail below.

In general, a lithium secondary battery includes an electrode assembly in which a cathode, an anode and a separation membrane interposed between the cathode and the anode, as well as an electrolyte are provided.

The cathode may be formed by applying a mixture of a cathode active material, a conductive material and a binder to a cathode (current) collector, drying the coated collector and pressing the treated collector and, if necessary, the mixture may additionally include filler.

The cathode collector may have a thickness ranging from 3 to 500 μm. Such cathode collector is not particularly restricted so long as it does not induce chemical modification of a battery while having excellent conductive properties. For example, the cathode collector may include stainless steel, aluminum, nickel, titanium, calcined carbon, or aluminum or stainless steel surface-treated with carbon, nickel, titanium, silver, etc., and so forth. The cathode collector may have microfine roughness on a surface thereof so as to reinforce adhesion of the cathode active material and, in addition, may be fabricated in various forms such as a film, a sheet, a foil, a net, a porous material, a foamed material, a non-woven fabric material, and the like.

The cathode active material may include, but is not limited to, for example: a lamellar compound such as lithium cobalt oxide ($LiCoO_2$) or lithium nickel oxide ($LiNiO_2$), or a compound substituted by one or more transition metal elements; a lithium manganese oxide represented by $Li_{1+x}Mn_{2-x}O_4$ (wherein x ranges from 0 to 0.33), $LiMnO_3$, $LiMn_2O_3$, $LiMnO_2$, etc.; a lithium copper oxide such as $Li_2CuO_2$; a vanadium oxide such as $LiV_3O_8$, $LiFe_3O_4$, $V_2O_5$, $Cu_2V_2O_7$, etc.; a Ni site type lithium nickel oxide represented by $LiNi_{1-x}M_xO_2$ (wherein M is Co, Mn, Al, Cu, Fe, Mg, B or Ga and x ranges from 0.01 to 0.3); a lithium manganese composite oxide represented by $LiMn_{2-x}M_xO_2$ (wherein M is Co, Ni, Fe, Cr, Zn or Ta and x ranges from 0.01 to 0.1) or $Li_2Mn_3MO_8$ (wherein M is Fe, Co, Ni, Cu or Zn); $LiMn_2O_4$ containing Li partially substituted by alkali-earth metal ions; a disulfide compound; $Fe_2(MoO_4)_3$, and the like.

The conductive material may be added in an amount of 1 to 50 wt. % of the total weight of a mixture containing the anode active material. Such conductive material is not particularly restricted so long as it does not cause chemical modification of a battery while having desired conductivity. For instance, the conductive material may include: graphite such as natural graphite or artificial graphite; carbon black such as acetylene black, ketjen black, channel black, furnace black, lamp black, summer black, etc.; conductive fiber such as carbon fiber, metal fiber, etc.; metal powder such as carbon fluoride, aluminum, nickel powder, etc.; conductive whiskers such as zinc oxide, potassium titanate, etc.; conductive metal oxides such as titanium oxide; polyphenylene derivatives, and so forth.

The binder used herein may comprise a component for supporting combination of an active material with the conductive material and/or binding to the collector and, in general, may be added in an amount of 1 to 50 wt. % of the total weight of a mixture comprising a cathode active material. Such binder may include, for example, polyvinylidene fluoride, polyvinyl alcohol, carboxymethyl cellulose (CMC), starch, hydroxypropyl cellulose, regenerated cellulose, polyvinyl pyrrolidone, tetrafluoro ethylene, polyethylene, polypropylene, ethylene-propylene-diene terpolymer (EPDM), sulfonated EPDM, styrene butyrene rubber, fluorine rubber, various copolymers, etc.

The filler used herein may optionally be used to inhibit expansion of a cathode and, is not particularly restricted so long as it is a fibrous material which does not cause chemical modification of a battery. For example, the filler may include an olefin based polymer such as polyethylene, polypropylene, etc.; or a fibrous material such as glass fiber, carbon fiber, etc.

An anode is fabricated by applying an anode active material to an anode collector and drying the coated collector and may optionally include other components described above.

The anode collector generally has a thickness of 3 to 500 μm. Such anode collector is not particularly restricted so long as it does not induce chemical modification of a battery while having favorable conductive properties. For example, the anode collector may include copper, stainless steel, aluminum, nickel, titanium, calcined carbon, copper or stainless steel that was surface-treated with carbon, nickel, titanium, silver, etc., aluminum-cadmium alloy, and so forth. Similar to a cathode collector, the anode collector may have microfine roughness on a surface thereof so as to reinforce adhesion of the anode active material, and the anode collector may be fabricated in various forms such as a film, a sheet, a foil, a net, a porous material, a foamed material, a non-woven fabric material, and the like.

The anode active material may include, for example: carbon such as graphitization retardant carbon, graphite based carbon, etc.; metal composite oxides such as $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb, Ge; and Me': Al, B, P, Si, Group 1, 2 or 3 elements; $0 < x \leq 1$; $1 \leq y \leq 3$; $1 \leq z \leq 8$); lithium metal; lithium alloy; silicon alloy; tin alloy; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$, etc.; a conductive polymer such as polyacetylene; Li—Co—Ni based materials, and the like.

The present invention further provides an electrolyte for a lithium secondary battery which includes a carbonate based electrolyte, a lithium salt and a compound represented by the above formula I.

Such lithium secondary battery may inhibit thickness swelling caused by deposition of a lithium metal moiety at the anode during charge/discharge due to irregular distribution of the electrolyte over an electrode assembly which in turn may prevent battery leakage, thus improving safety of the battery. Moreover, due to the presence of the carbonyl group as a polar functional group, deterioration in dissociation and/or delivery of lithium ions often occurring by a conventional gel polymer electrolyte may be prevented, thereby considerably decreasing performance degradation of the battery.

EXAMPLES

Now, the present invention will be described in more detail in the following description with reference to exemplary embodiments and examples of the present invention, which are given for illustrative purposes only and should not be construed as limiting the spirit and scope of the invention.

Example 1

1-1. Preparation of Non-Aqueous Electrolyte Containing Lithium Salt

EC, EMC and DEC were mixed together in a relative ratio by weight of 4:1:5 to prepare a solvent for a non-aqueous electrolyte and 1M $LiPF_6$ was added to the solvent. Then, 1.5 wt. % of vinylene carbonate (VC), 0.5 wt. % of propylene sulfone (PS) and 5 wt. % of polyethyleneglycol diglycidylether represented by formula I were added to the above mixture to produce the non-aqueous electrolyte.

1-2. Fabrication of Cathode $LiCoO_2$ was used as a cathode active material. A cathodic composite including 95.4 wt. % of $LiCoO_2$ having a particle diameter of 18 μm, 1.6 wt. % of Super-P as a conductive material, 3 wt. % of PVdF as a binder was added to N-methyl-2-pyrrolidone (NMP) as a solvent to prepare a cathodic slurry. The cathodic slurry was applied to an aluminum collector to fabricate a cathode.

1-3. Fabrication of Anode

Graphite was used as an anode active material. The graphite as well as 3.5 wt. % of PVdF were added to NMP in order to prepare an anodic slurry. The anodic slurry was applied to a copper collector to fabricate an anode.

1-4. Fabrication of Battery

A porous polyethylene separation membrane Celgard™ was interposed between the cathode formed in 1.2 and the anode formed in 1.3, followed by pouring the electrolyte prepared in 1.1 thereinto, so as to fabricate a lithium secondary battery.

Comparative Example 1

A battery was fabricated by the same procedure as described in Example 1, except that polyethyleneglycol diglycidylether was not added to the electrolyte.

Experimental Example 1

The batteries fabricated in Example 1 and Comparative Example 1, respectively, were charged with 1 C, 50 mA (cut-off) until a battery charge reached 4.2V, and then, were discharged with 1 C until the battery charge reached 3V (cut-off). This charge/discharge cycle was repeated 500 times at room temperature. Ageing the batteries at room temperature for 5 days after fabrication of the same, each of the batteries was subjected to a capacity check. Immediately after the capacity check, a cycle test was conducted.

Figure 2:
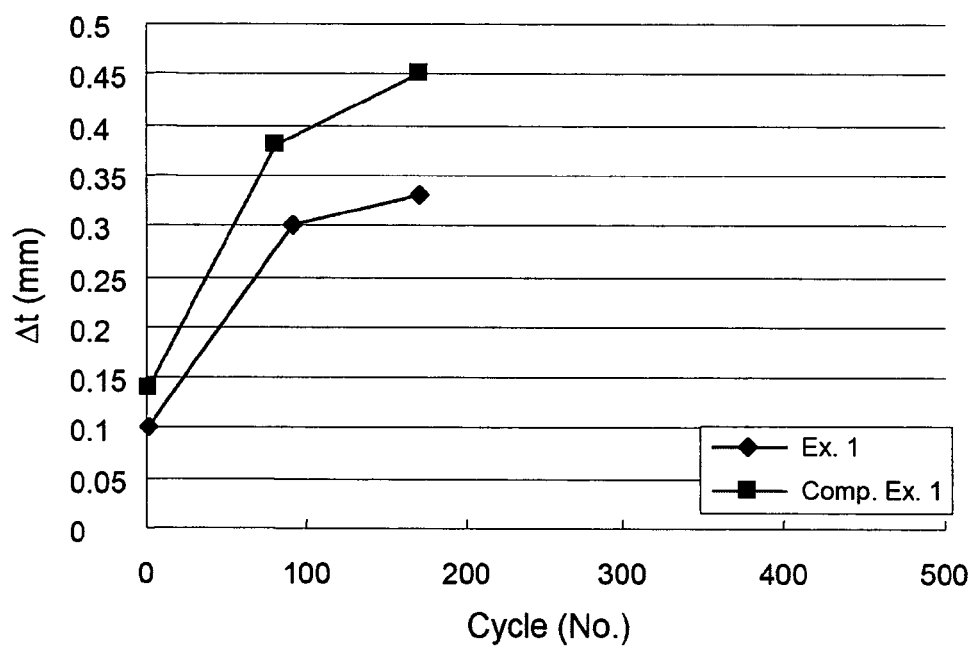
FIG. 2 contains graphs illustrating thickness change of the battery cell according to the present invention fabricated in Example 1, compared to the conventional battery cell fabricated in Comparative Example 1, according to Experimental Example 1 of the present invention.

A variation in charge capacity and a change in thickness of the battery during 200 cycles were measured and the measured results are shown in FIGS. 1 and 2, respectively.

As shown in FIG. 1, it was found that the inventive battery cell (Example 1) has substantially the same capacity as a conventional battery cell (Comparative Example 1). On the other hand, as shown in FIG. 2, the inventive battery (Example 1) exhibited considerably reduced thickness swelling, compared to a conventional lithium ion secondary battery (Comparative Example 1). More particularly, the inventive battery fabricated in Example 1 had a thickness change (Δt) of about 0.34 mm after 172 cycles while the conventional battery fabricated in Comparative Example 1 had Δt of about 0.45 mm. Therefore, the thickness change of the inventive battery was 0.11 mm smaller than that of the conventional battery, thus demonstrating remarkably reduced thickness change.

Consequently, it can be understood that the inventive battery may have substantially the same performance as a conventional secondary battery while considerably inhibiting thickness swelling which is a problem of the conventional battery.

Experimental Example 2

Figure 3:
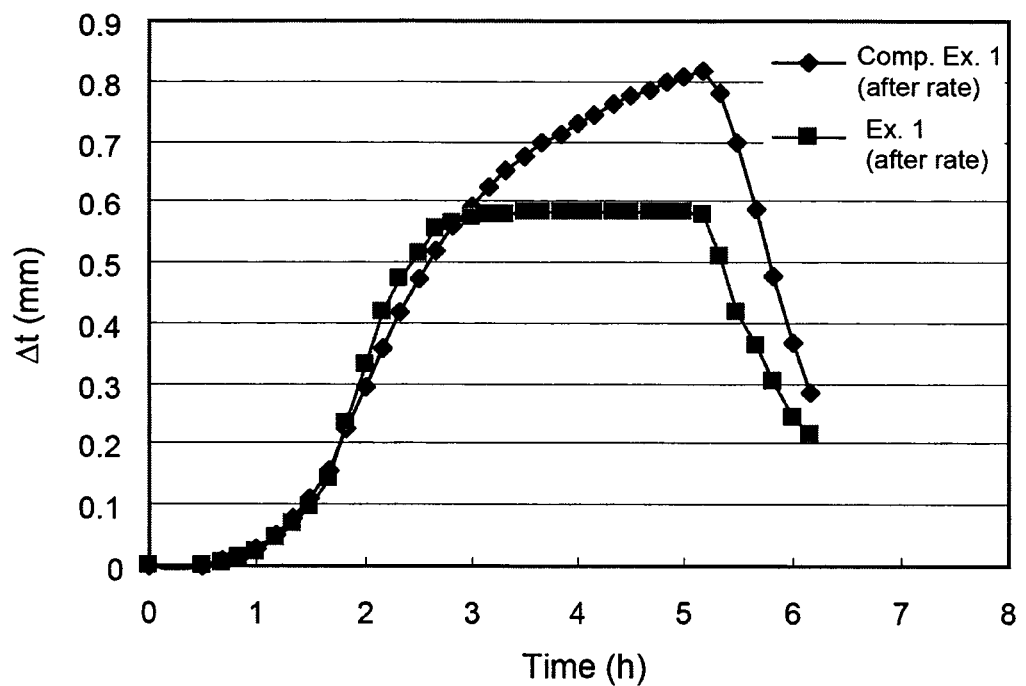
FIG. 3 contains graphs illustrating thickness change of the battery cell according to the present invention fabricated in Example 1, compared to the battery cell fabricated in Comparative Example 1, according to Experimental Example 2 of the present invention.

After the batteries fabricated in Example 1 and Comparative Example 1, respectively, were stored at 90° C. for four (4) weeks, a thickness of each battery was measured and the results are shown in FIG. 3. Additionally, an amount of gas generated during the storage is listed in the following Table 1.

TABLE 1

|  | Example 1 (μL) | | Comparative Example 1 (μL) | |
| --- | --- | --- | --- | --- |
|  | Charge | Discharge | Charge | Discharge |
| $H_2$ | 51 | 6.9 | 0 | 4.0 |
| CO | 142 | 222 | 107 | 85 |
| $CH_4$ | 60 | 81 | 71 | 84 |
| $C_2H_6$ | 20 | 36 | 29 | 14 |
| $CO_2$ | 15 | 9 | 469 | 324 |
| $C_2H_4$ | 1.3 | 2.1 | 3.0 | 0.6 |

As shown in FIG. 3, a thickness of the battery according to Example 1 was little increased after 2.5 hours with a maximum thickness of 0.6 mm only which means the thickness change Δt compared to that of the battery before charge/discharge. Conversely, the thickness of the battery according to Comparative Example 1 was continuously increased even after 5 hours and the maximum thickness, that is, Δt was 0.82 mm. Therefore, a difference in thickness changes between the batteries according to Example 1 and Comparative Example 1 was nearly 0.22 mm. Accordingly, it can be seen that the battery according to Example 1 fabricated by adding polyethyleneglycol diglycidylether to the electrolyte may considerably inhibit thickness swelling during storage at a high temperature, thereby exhibiting improved performance thereof.

As listed in TABLE 1, an amount of a gas generated during reduction and exhausted outside, such as $H_2$, $CH_4$, $C_2H_6$, $C_2H_4$, etc. was approximately the same in both the inventive battery according to Example 1 and the conventional battery according to Comparative Example 1. Therefore, it was considered that the above both cases have little difference in reaction between the anode and the electrolyte. Meanwhile, as for amounts of CO and $CO_2$ gases which are generated during oxidation and/or reduction, the battery according to Example 1 showed a little higher CO generation than the battery according to Comparative Example 1 while considerably reduced amount of $CO_2$, compared to the battery according to Comparative Example 1. In consideration of the above results, it is understood that a secondary battery according to the present invention exhibits a considerably lower decomposition reaction rate between a cathode and an electrolyte, thus achieving noticeably enhanced performance at high temperatures.

INDUSTRIAL APPLICABILITY

As described above, the secondary battery containing polyalkyleneglycol diglycidylether as an additive in accordance with the present invention may considerably inhibit thickness swelling so as to attain a great improvement in lifespan and safety of the battery.

Although the examples and comparative examples of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A non-aqueous secondary battery, comprising:
   an ionic salt-based liquid electrolyte, wherein a substance represented by the following formula (1) is included in an amount of 1 to 7wt. % relative to the total weight of the electrolyte:

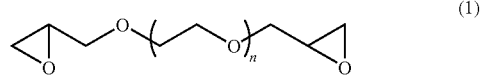

wherein n is an integer ranging from 0 to 10.

2. The non-aqueous secondary battery according to claim 1, wherein n ranges from 1 to 6.

3. The non-aqueous secondary battery according to claim 1, wherein the electrolyte is a mixture of at least one linear carbonate compound and at least one cyclic carbonate compound.

4. The non-aqueous secondary battery according to claim 1, wherein the ionic salt is a lithium salt.

5. The non-aqueous secondary battery according to claim 1, wherein he secondary battery is a lithium secondary battery.

6. A liquid electrolyte for a lithium secondary battery, comprising:
   a carbonate based electrolyte,
   a lithium salt, and
   1 to 7wt. % of a substance represented by the following formula (1) relative to the total weight of the electrolyte:

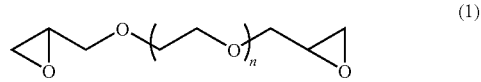

wherein n is an integer ranging from 0 to 10.

* * * * *